(12) United States Patent
Jiang et al.

(10) Patent No.: US 12,320,939 B2
(45) Date of Patent: Jun. 3, 2025

(54) FREQUENCY-DEPENDENT MACHINE LEARNING MODEL IN SEISMIC INTERPRETATION

(71) Applicant: Landmark Graphics Corporation, Houston, TX (US)

(72) Inventors: Fan Jiang, Sugarland, TX (US);
Alejandro Jaramillo, Edinburgh (GB);
Steven Roy Angelovich, Livermore, CO (US)

(73) Assignee: Landmark Graphics Corporation, Houston, TX (US)

( * ) Notice: Subject to any disclaimer, the term of this patent is extended or adjusted under 35 U.S.C. 154(b) by 152 days.

(21) Appl. No.: 17/825,914

(22) Filed: May 26, 2022

(65) Prior Publication Data

US 2023/0288594 A1    Sep. 14, 2023

Related U.S. Application Data

(60) Provisional application No. 63/317,825, filed on Mar. 8, 2022.

(51) Int. Cl.
*G01V 1/34*  (2006.01)
*G01V 1/28*  (2006.01)
(Continued)

(52) U.S. Cl.
CPC .............. *G01V 1/345* (2013.01); *G01V 1/282* (2013.01); *G01V 1/301* (2013.01); *G06N 20/20* (2019.01); *G01V 2210/642* (2013.01)

(58) Field of Classification Search
CPC ........ G01V 1/345; G01V 1/282; G01V 1/301; G01V 2210/642; G01V 1/306; G01V 1/307; G06N 20/20; G06N 3/09; G06N 3/0464
(Continued)

(56) References Cited

U.S. PATENT DOCUMENTS

2007/0299614 A1* 12/2007 Dewarrat ................. G01V 1/28
                                                    715/700
2020/0183032 A1*  6/2020 Liu ......................... G01V 1/282
(Continued)

FOREIGN PATENT DOCUMENTS

CN      103364835 A   * 10/2013
KR      102294384 B1    8/2021
WO      2021183518 A1   9/2021

OTHER PUBLICATIONS

English translation of CN 201310272364, Oct. 23, 2013. (Year: 2013).*

(Continued)

*Primary Examiner* — Michael P Nghiem
(74) *Attorney, Agent, or Firm* — Kilpatrick Townsend & Stockton LLP

(57) ABSTRACT

Frequency-dependent machine-learning (ML) models can be used to interpret seismic data. A system can apply spectral decomposition to pre-processed training data to generate frequency-dependent training data of two or more frequencies. The system can train two or more ML models using the frequency-dependent training data. Subsequent to training the two or more ML models, the system can apply the two or more ML models to seismic data to generate two or more subterranean feature probability maps. The system can perform an analysis of aleatoric uncertainty on the two or more (Continued)

subterranean feature probability maps to create an uncertainty map for aleatoric uncertainty. Additionally, the system can generate a filtered subterranean feature probability map based on the uncertainty map for aleatoric uncertainty.

20 Claims, 6 Drawing Sheets

(51) Int. Cl.
*G01V 1/30* (2006.01)
*G06N 20/20* (2019.01)

(58) Field of Classification Search
USPC .......................................................... 702/16
See application file for complete search history.

(56) References Cited

U.S. PATENT DOCUMENTS

| | | | |
|---|---|---|---|
| 2020/0348433 A1* | 11/2020 | Xu ........................ G01V 99/005 |
| 2020/0375549 A1* | 12/2020 | Wexler ............... A61B 5/14532 |
| 2021/0063591 A1* | 3/2021 | Hu .......................... G01V 1/282 |
| 2021/0116598 A1 | 4/2021 | Thorne et al. | |
| 2021/0209490 A1* | 7/2021 | Casas ..................... G06Q 50/02 |
| 2021/0356361 A1* | 11/2021 | Kenny ...................... G06N 3/08 |
| 2021/0390400 A1* | 12/2021 | Yao ......................... G06N 3/045 |
| 2022/0004919 A1 | 1/2022 | Zhang et al. | |
| 2022/0343218 A1* | 10/2022 | Yueksel ................. G06N 20/20 |
| 2023/0026857 A1* | 1/2023 | Di ........................... G01V 1/282 |
| 2023/0101523 A1* | 3/2023 | Poplin .................... G16B 35/20 |
| | | | 506/2 |
| 2023/0122128 A1* | 4/2023 | Chen ....................... G06N 3/08 |
| | | | 702/2 |

OTHER PUBLICATIONS

Convolutional Neural Networks, 2015, The Wayback Machine. (Year: 2015).*
Jiang et al., "Seismic attribute-guided automatic fault prediction by deep learning", EAGE Annual 82nd Conference + Exhibition, Amsterdam, Dec. 8-11, 2020, 5 pages.
Kwon et al., "Uncertainty quantification using Bayesian neural networks in classification: Application to biomedical image segmentation", Computational Statistics & Data Analysis, vol. 142, Feb. 2020, 13 pages.
Lyu et al., "Seismic fault enhancement using spectral decomposition assisted attributes", SEG Technical Program Expanded Abstracts, 2019, pp. 1938-1942.
International Application, International Search Report and Written Opinion, PCT/US2022/031179, Nov. 30, 2022, 8 pages.
PCT/US2022/031179, "International Search Report and Written Opinion", Nov. 30, 2022, 8 pages.

* cited by examiner

FREQUENCY-DEPENDENT MACHINE LEARNING MODEL IN SEISMIC INTERPRETATION

CROSS REFERENCE TO RELATED APPLICATION

This claims priority to U.S. Ser. No. 63/317,825, titled "Frequency-Dependent Machine Learning Model in Seismic Interpretation" and filed Mar. 8, 2022, the entirety of which is incorporated herein by reference.

TECHNICAL FIELD

The present disclosure relates generally to wellbore operations and, more particularly (although not necessarily exclusively), to machine-learning models used in interpreting seismic data.

BACKGROUND

Interpreting 3D seismic data can assist with understanding certain subterranean features, such as reservoir compartmentalization analysis and drilling hazards. Interpreting 3D seismic data for identifying and interpreting faults can be time-consuming and can be biased by the level of expertise exhibited by a user. Deep learning techniques can be successful in automating fault predictions from seismic data. But, limited resolution of fault probability and the presence of false-positive faults can pose an obstacle to the accurate identification of geologically plausible faults.

DETAILED DESCRIPTION

Certain aspects and examples of the present disclosure relate to implementing a frequency-dependent machine-learning (ML) model in seismic interpretation with uncertainty analysis. Performing a structure-oriented filter on synthetic seismic data can improve quality of ML model training data. Applying spectral decomposition to pre-processed training data can create several sets of frequency-dependent data. The frequency-dependent data can train multi-channel, multi-scale convolutional neural networks to become frequency-dependent, ML models. The frequency-dependent ML models can predict subterranean feature probability maps. Subterranean features can include geologic faults, subterranean channels, tunnels, etc.

In some examples, an aleatoric uncertainty analysis can help analyze areas where a false-positive fault may exist and can help identify low probability areas. The aleatoric uncertainty analysis can be applied to geologic fault probability maps to filter out low-probability faults and generate a high-fidelity fault probability map. Aleatoric uncertainty can include a form of uncertainty that can arise due to an unpredictable, random nature of a physical system under study. Due to the random nature of aleatoric uncertainty, quantifying the aleatoric uncertainty of a system can include statistical or probabilistic approaches. Aleatoric uncertainty may not be reduced and instead may be identified and quantified.

In some examples, a structure filter can be applied to ML training data that in some examples can include an optimized hyperparameter search workflow in programming language environments such as Python. Spectral decomposition can be applied to the ML training data to train several frequency-dependent ML models. Aleatoric uncertainty can be determined from a subterranean feature probability result and an uncertainty map can be produced. The uncertainty map can filter out any low-probability subterranean features and false-positive subterranean features to create high-fidelity subterranean feature probability maps.

Some examples of the present example can improve accuracy of ML fault prediction tools used to delineate major fault planes and decrease small noisy faults which can prevent correct interpretation of seismic data. The aleatoric uncertainty analysis can provide a systematic tool to analyze the result of subterranean feature predictions.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
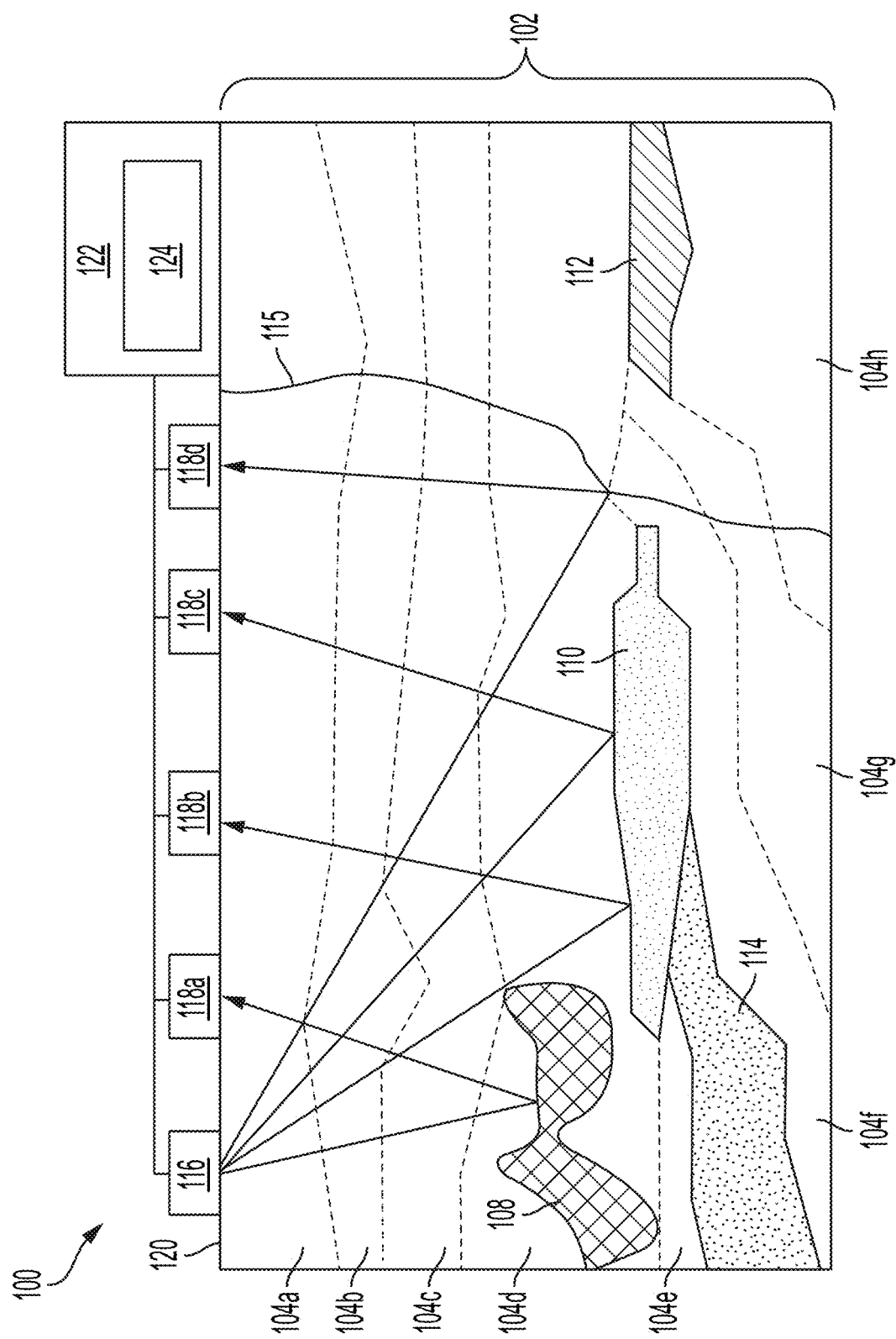
FIG. 1 is a cross-sectional view of an environment for determining seismic data and predicting subterranean feature locations according to one example of the present disclosure.

FIG. 1 is a cross-sectional view of an environment 100 for determining seismic data and predicting subterranean feature locations according to one example of the present disclosure. The environment 100 includes a subterranean formation 102 formed from various earth strata 104a-h. The subterranean formation 102 includes various geological bodies, such as a salt body 108 that includes salt, an oil body 110 that includes oil, a gas body 112 that includes gas, and a water body 114 that includes water. In some examples, subterranean formation 102 may include more, fewer, or other types of strata and geological bodies. Additionally, the subterranean formation 102 can include a subterranean feature 115 that can represent a discontinuity in the subterranean formation 102. In some cases, the subterranean feature 115 can represent a discontinuity with respect to the earth strata 104 and can separate two or more geological bodies. As illustrated, the subterranean formation 102 includes one subterranean feature 115, but the subterranean formation 102 can include other suitable amounts of subterranean features 115. Examples of subterranean features 115 can include geological faults, joints, disconformities, channels, tunnels, etc.

At least one portion of the environment 100 can be positioned at the surface 120 of the subterranean formation 102 for detecting geological bodies or otherwise characterizing subterranean features 115 in the subterranean formation 102. For example, the environment 100 can include signal source 116 and sensors 118a-d, which, for example, can be used to detect and receive seismic data about the subterranean formation 102. Examples of the signal source 116 can include a vibration unit, an explosive charge, or other suitable type of signal source 116, and examples of the sensors 118a-d can include geophones, hydrophones, or other suitable types of sensors 118. The signal source 116 can emit one or more waves into a target area of the subterranean formation 102. In the example shown in FIG. 1, the waves are represented by black arrows and the target area is the portion of the subterranean formation 102 positioned below sensors 118a-d. The waves can reflect off the geological bodies, the subterranean feature 115, or other suitable components of the subterranean formation 102 and return to the sensors 118. The sensors 118 can detect the reflected waves and provide corresponding seismic data to a computing device 122, which may be included in the environment 100.

As one particular example, the signal source 116 can include a vibration unit and the sensors 118 can include geophones. The vibration unit can emit vibrations that propagate through the target area of the subterranean formation 102, reflect off the geological bodies, the subterranean feature 115, or other suitable components, and return to the geophones. The geophones can receive the reflected vibrations and generate seismic data based on the reflected vibrations. The geophones can then transmit their respective seismic data to the computing device 122. The computing device 122 can include trained ML models 124 that can receive frequency-dependent training data as input and provide subterranean feature probability maps as an output. The computing device 122 may then determine filtered subterranean feature probability maps using aleatoric uncertainty analysis.

While FIG. 1 depicts an example of environment 100 that includes certain components (e.g., the signal source 116, the sensors 118a-d, and the computing device 122), other examples may include more, fewer, or different components. For instance, different examples may involve the computing device 122 receiving seismic data from a remote computing device via a network, such as the Internet. The computing device 122 can receive the seismic data from the sensors 118a-d. And, in some examples, the computing device 122 may be positioned offsite, rather than proximate to the target area of the subterranean formation 102.

Figure 2:
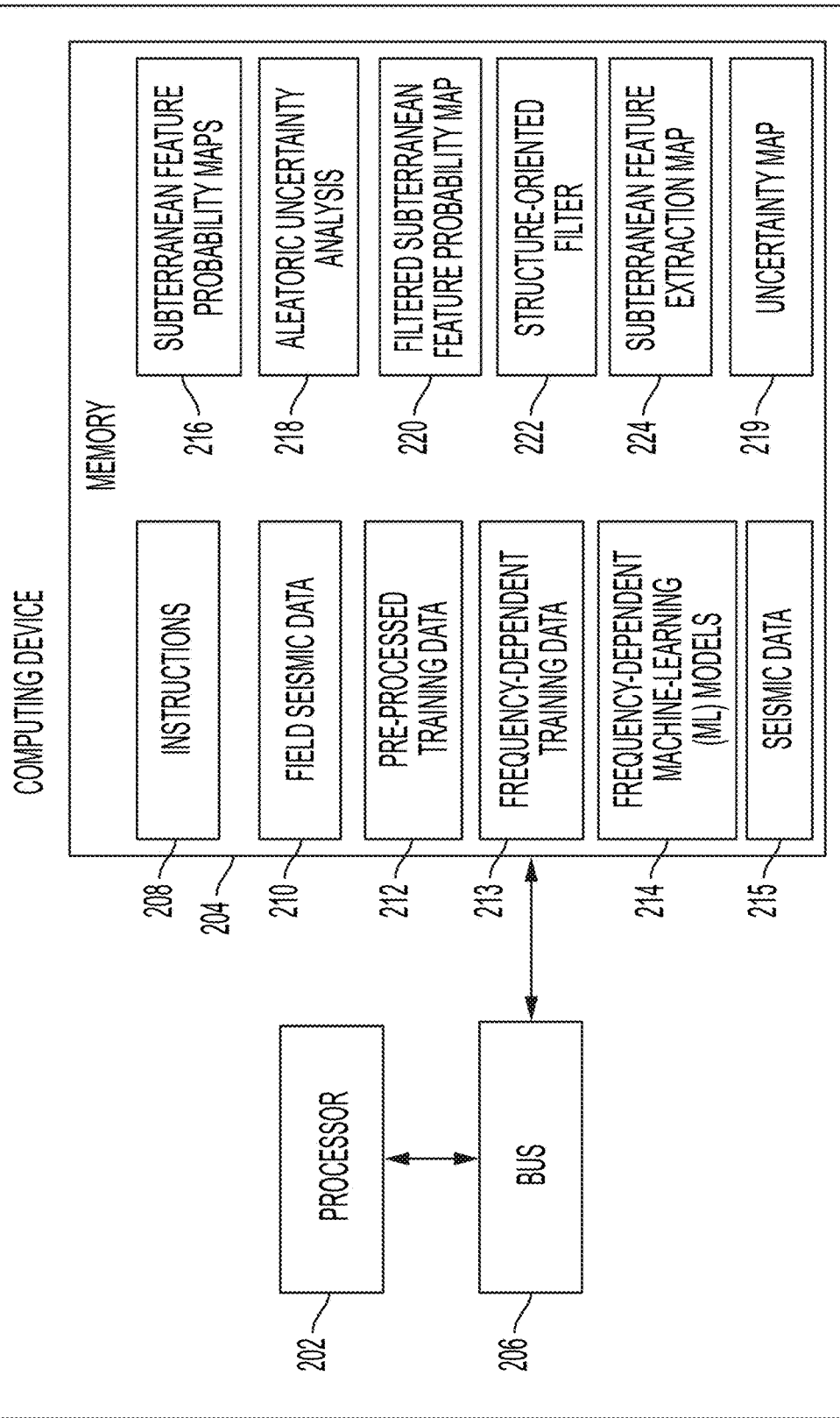
FIG. 2 is a block diagram of a computing device for training frequency-dependent machine-learning models and producing filtered subterranean feature probability maps according to one example of the present disclosure.

FIG. 2 is a block diagram of a computing device 122 for training frequency-dependent ML models and producing filtered subterranean feature probability maps 220 according to one example of the present disclosure. The components in FIG. 2, such as a processor 202, a memory 204, bus 206, and the like, may be integrated into a single structure such as within a single housing of the computing device 122. Alternatively, the components shown in FIG. 2 can be distributed with respect to one another and in electrical communication with each other.

The computing device 122 includes the processor 202 communicatively coupled to the memory 204 by the bus 206. The processor 202 can include one processor or multiple processors. Non-limiting examples of the processor 202 include a Field-Programmable Gate Array (FPGA), an application-specific integrated circuit (ASIC), a microprocessor, or any combination of these. The processor 202 can execute instructions 208 stored in the memory 204 to perform operations. In some examples, the instructions 208 can include processor-specific instructions generated by a compiler or an interpreter from code written in any suitable computer-programming language, such as C, C++, C#, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read the instructions 208. A non-transitory computer-readable medium can include electronic, optical, magnetic, or other storage devices capable of providing the processor 202 with the instructions 208 or other program code. Non-limiting examples of a non-transitory computer-readable medium include magnetic disk(s), memory chip(s), random access memory (RAM), an ASIC, a configured processor, or any other medium from which a computer processor can read the instructions.

In some examples, the memory 204 can further include field seismic data 210 that can be measured from a subterranean formation 102. The processor 202 may convert the field seismic data 210 using a structure-oriented filter 222 into pre-processed training data 212. The pre-processed training data 212 can be used to make frequency-dependent training data 213. The memory may also store frequency-dependent ML models 214. The processor 202 can train the frequency-dependent ML models 214 using the frequency-dependent training data 213. The trained frequency-dependent ML models 214 can be applied to seismic data 215 to generate, for example, subterranean feature probability maps 216. The processor 202 can produce a filtered subterranean feature probability map 220 by applying an aleatoric uncertainty analysis 218 to the subterranean feature probability maps 216 to produce an uncertainty map 219. Additionally, in some examples, the processor 202 can create a subterranean feature extraction map 224 from the filtered subterranean feature probability map 220.

Figure 3:
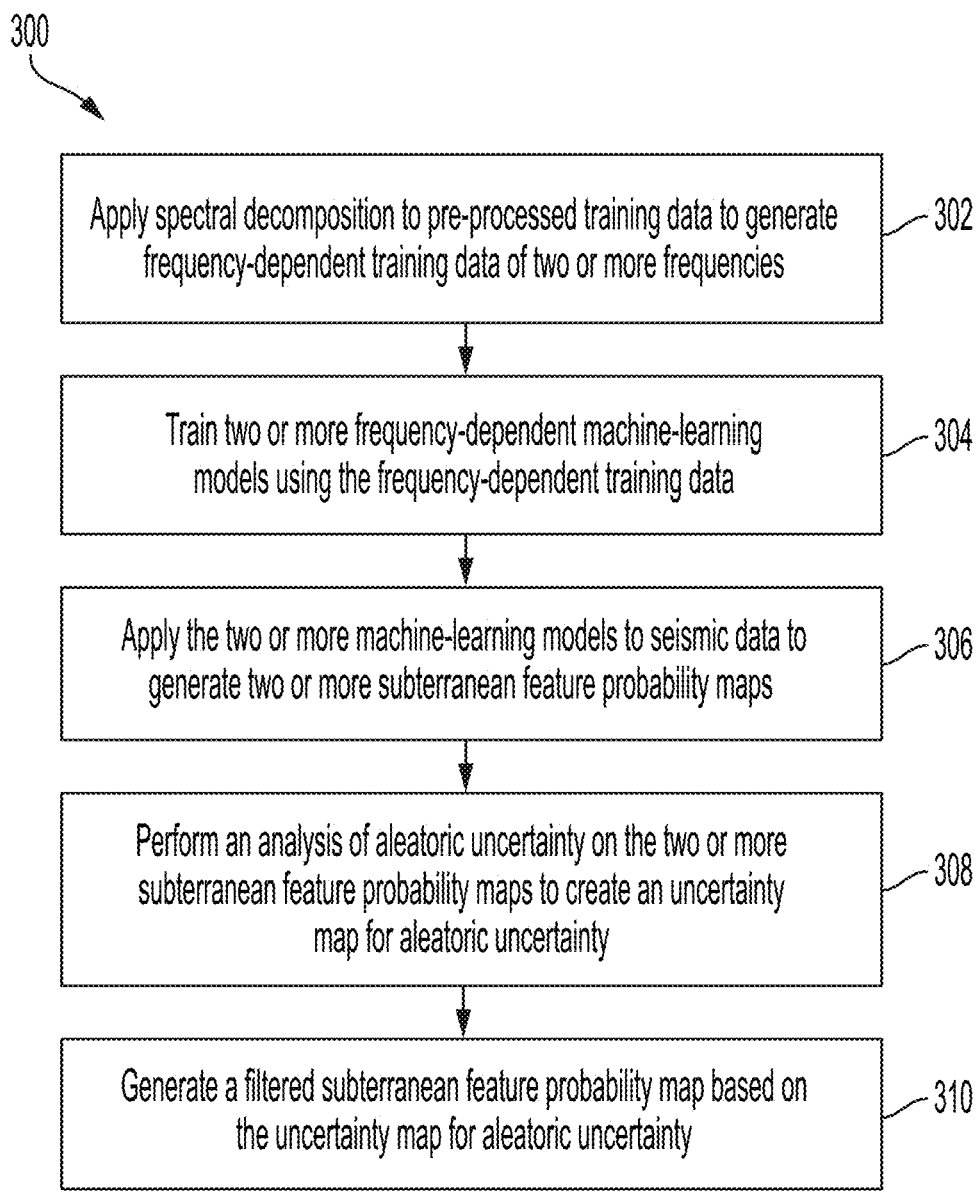
FIG. 3 is a flowchart of a process for training frequency-dependent machine learning models and determining filtered subterranean feature probability maps according to one example of the present disclosure.

In some examples, the computing device 122 can implement a process 300 shown in FIG. 3 for effectuating some aspects of the present disclosure. Other examples can involve more operations, fewer operations, different operations, or a different order of operations than shown in FIG. 3. The operations of FIG. 3 are described below with reference to the components shown in FIG. 2.

Figure 4:
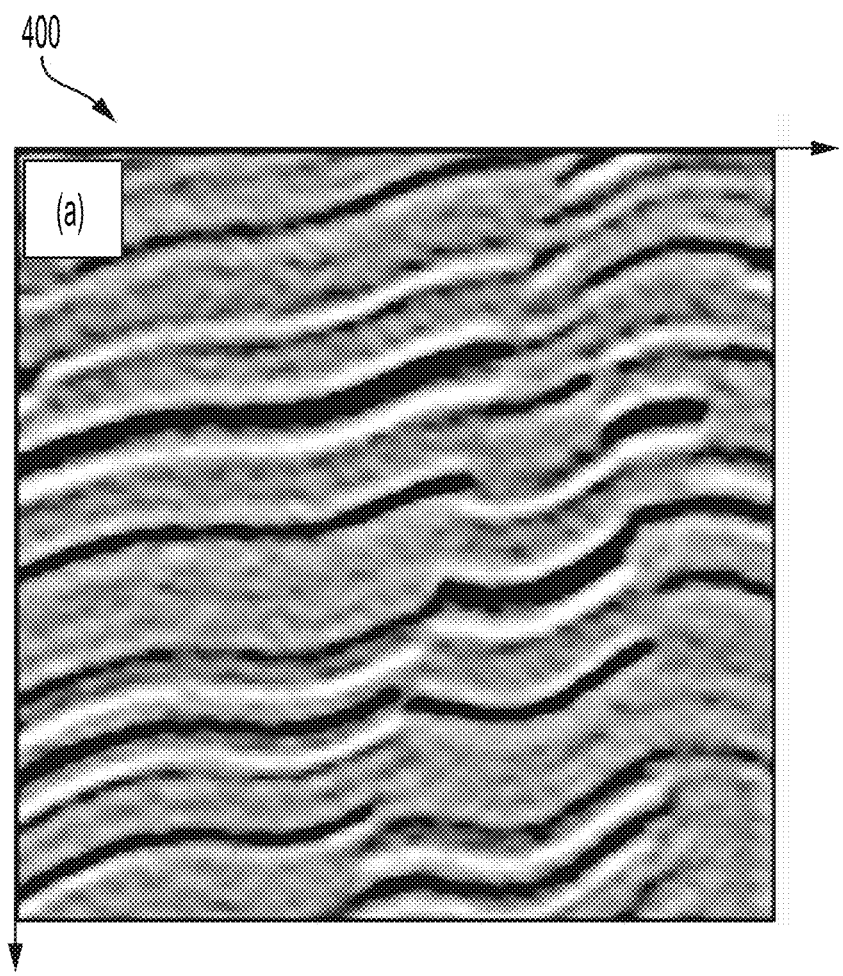
FIG. 4 is a graph that represents an example of field seismic data according to one example of the present disclosure.

FIG. 3 is a flowchart of a process 300 for training frequency-dependent ML models 214 and determining filtered subterranean feature probability maps 220 according to one example of the present disclosure. The process 300 may be performed by software, firmware, hardware or a combination thereof. At block 302, a processor 202 applies spectral decomposition to pre-processed training data 212 to generate frequency-dependent training data 213 of two or more frequencies. In some examples, the processor 202 performs a structure-oriented filter 222 on field seismic data 210 to produce the pre-processed training data 212. An example of the field seismic data 210 is shown in FIG. 4. The field seismic data 210 can be measured in a subterranean formation 102, as described above in the description of FIG. 1. The field seismic data can include subterranean features. Examples of subterranean features can include geologic faults, channels, tunnels, etc.

In some examples, the structure-oriented filter 222 can include moving filter windows. In some examples, the processor 202 can evaluate sizes of the filter windows and select an optimal combination of xyz coordinate limits on the window size. An optimal window size can preserve discontinuities and reduce noise in the field seismic data 210.

Figure 5:
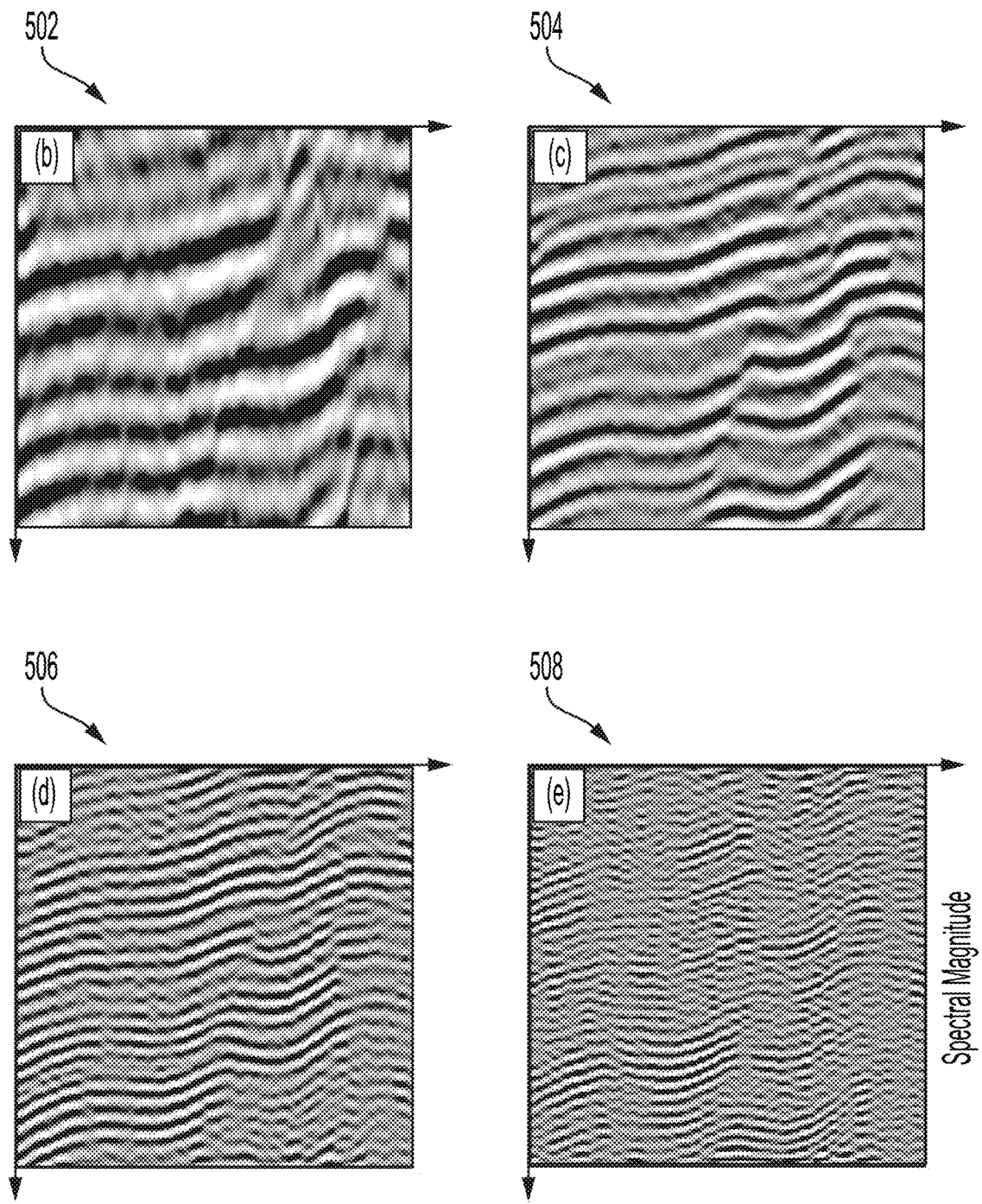
FIG. 5 is a series of graphs that depict an example of a frequency-dependent training data set according to one example of the present disclosure.

Applying spectral decomposition to the pre-processed training data 212 can result in multiple sets of frequency-dependent training data 213. An example of a set of frequency dependent training data is shown in FIG. 5. Each set of frequency-dependent training data can be used to train a ML model as described in block 304.

At block 304, the processor 202 trains two or more frequency-dependent ML models 214 using the frequency-dependent training data 213. Each of the frequency-dependent ML models 214 can be associated with a separate frequency. For example, each of the four frequency-dependent data sets shown in FIG. 5 can train a separate ML model. In some examples, the frequency-dependent ML models 214 can include convolutional neural networks. Convolutional neural networks can be types of artificial neural networks used in image processing. In some examples, the neural networks can be multi-channel, multi-scale convolutional neural networks. The trained frequency-dependent ML models 214 can predict subterranean feature probability maps 216 as described in block 306.

In some examples, training the two or more frequency-dependent ML models includes applying a bootstrapping model. The bootstrapping model can include randomly selecting partial training data from the frequency-dependent training data and measuring a probability distribution function that can quantify uncertainty in a ML model. In some examples, the two or more frequency-dependent ML models include Bayesian Neural Networks.

At block 306, the processor 202 applies the two or more frequency-dependent ML models 214 to seismic data 215 to generate two or more subterranean feature probability maps 216. The seismic data 215, like the field seismic data 210, can be measured in the subterranean formation 102, as described above in the description for FIG. 1. But, the seismic data 215 can be measured in a different subterranean formation than the subterranean formation 102 used to measure the field seismic data 210. The seismic data 215 can be measured in a different area of the same subterranean formation as the subterranean formation 102 used to measure the field seismic data 210. The subterranean feature probability maps 216 can predict a range of subterranean features including some low-probability subterranean features that can lead to false positive predictions of locations of subterranean features.

At block 308, the processor 202 performs an aleatoric uncertainty analysis 218 on the two or more subterranean feature probability maps 216 to create an uncertainty map 219 for aleatoric uncertainty. The aleatoric uncertainty analysis 218 can identify areas of low-probability subterranean features and analyze these areas. In some examples, performing the aleatoric uncertainty analysis 218 includes selecting one of the two or more subterranean feature probability maps 216. An algorithm can be applied to quantify aleatoric uncertainty in the selected subterranean feature probability map and the uncertainty map 219 for aleatoric uncertainty can be created.

At block 310, the processor 202 generates a filtered subterranean feature probability map 220 based on the uncertainty map 219 for aleatoric uncertainty. The uncertainty map 219 can be applied to filter out high uncertainty areas from the selected subterranean feature probability map 216. In some examples, the filtered subterranean feature probability map 220 can be a factor when controlling a direction of a drill used during a wellbore drilling operation. In some examples, a subterranean feature extraction map 224 can be generated based on the filtered subterranean feature probability map 220.

FIG. 4 shows a graph 400 that represents an example of field seismic data (e.g., field seismic data 210 described in FIG. 2). The field seismic data can be measured in a subterranean formation 102, as described above for FIG. 1. The field seismic data can include subterranean features that are of interest for wellbore operations. A structure-oriented filter 222 can be applied to the field seismic data to produce pre-processed training data 212. A processor 202 can apply spectral decomposition to the field seismic data to produce a set of frequency-dependent training data 213.

FIG. 5 is a series of graphs that depict an example of a frequency-dependent training data 213 set. The graphs depicted in FIG. 5 represent outputs after a processor 202 applied spectral decomposition to the field seismic data 210 of FIG. 4. The series of graphs include frequency data for 5 Hz 502, 13 Hz 504, 22 Hz 506, and 31 Hz 508. As illustrated by FIG. 5, the field seismic data 210 can be decomposed into four frequency-dependent data maps. In other examples, the number of maps can be less than or greater than four. In the example illustrated by FIG. 5, there is about an 8 Hz incremental difference separating successive maps. In other examples, the incremental difference can be less than or greater than 8 Hz. Each of the frequency-dependent training data maps can be used to train a frequency-dependent ML model.

Figure 6:
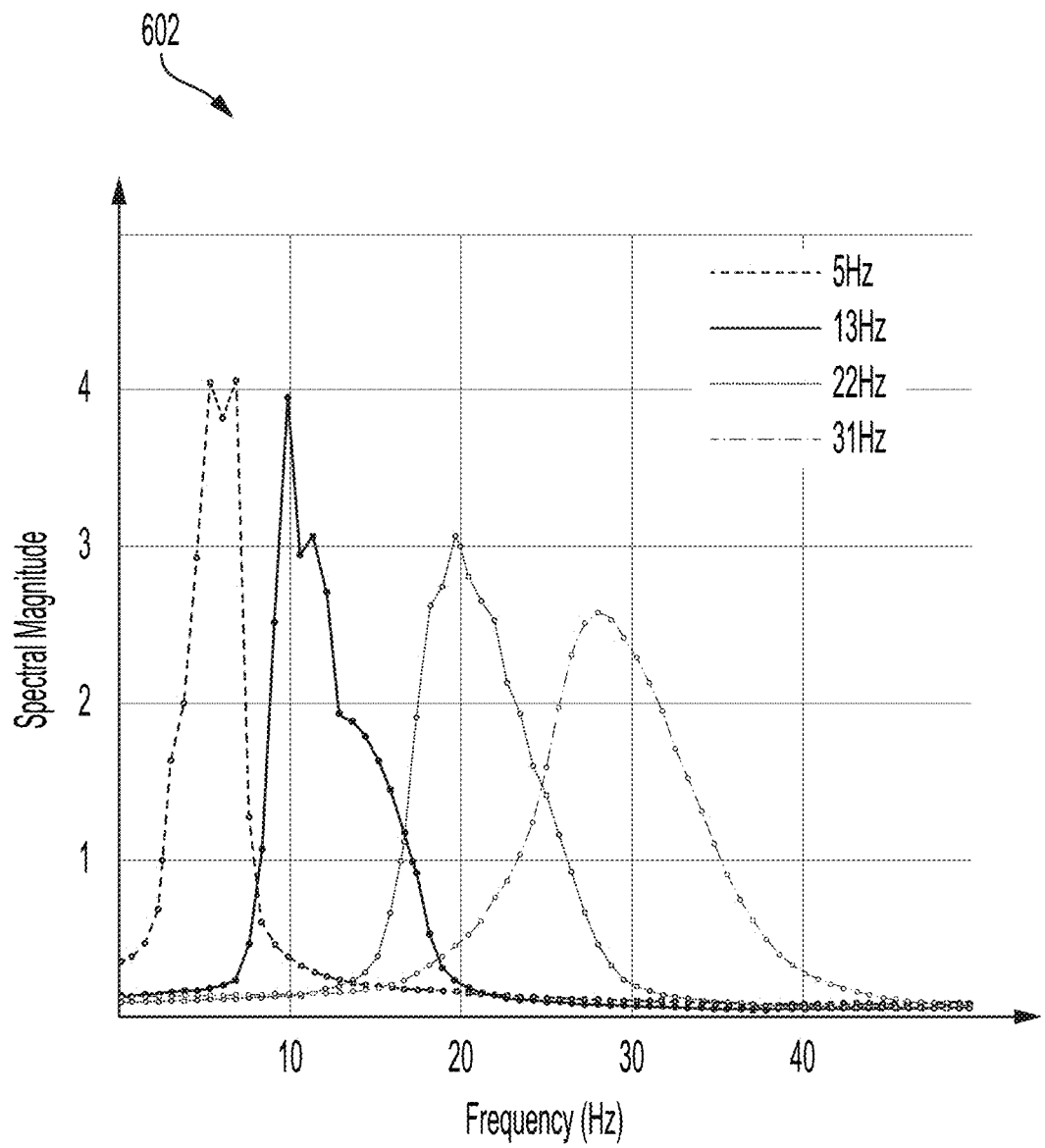
FIG. 6 is a graph that depicts frequency spectral data for a frequency-dependent training data set according to one example of the present disclosure.

FIG. 6 is a graph 602 that depicts frequency spectral data for a frequency-dependent training data 213 set. The graph 602 illustrated in FIG. 6 was produced from the frequency-dependent training data illustrated in FIG. 5. The graph 602 shows that in this example, full band seismic data can exhibit a peak in spectral magnitude at 10 Hz. The peak in spectral magnitude can be used to help choose a frequency of a selected subterranean feature probability map 216 for applying an aleatoric uncertainty analysis 218.

In some aspects, methods, systems, and non-transitory computer-readable media for frequency-dependent ML models in seismic interpretation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: applying spectral decomposition to pre-processed training data to generate frequency-dependent training data of two or more frequencies; training two or more machine-learning (ML) models using the frequency-dependent training data; subsequent to training the two or more ML models, applying the two or more ML models to seismic data to generate two or more subterranean feature probability maps; performing an analysis of aleatoric uncertainty on the two or more subterranean feature probability maps to create an uncertainty map for aleatoric uncertainty; and generating a filtered subterranean feature probability map based on the uncertainty map for aleatoric uncertainty.

Example 2 is the method of example 1, wherein performing the analysis of aleatoric uncertainty comprises: selecting one of the two or more subterranean feature probability maps; applying an algorithm to quantify aleatoric uncertainty in the selected subterranean feature probability map; and creating the uncertainty map for aleatoric uncertainty.

Example 3 is the method of example 2, wherein generating the filtered subterranean feature probability map comprises applying the uncertainty map to filter out high uncertainty areas from the selected subterranean feature probability map.

Example 4 is the method of examples 1-3, further comprising performing a structure-oriented filter on field seismic data to produce the pre-processed training data.

Example 5 is the method of example 4, wherein performing the structure-oriented filter comprises optimizing a size of a moving filter window to preserve discontinuities and reduce noise in the field seismic data.

Example 6 is the method of examples 1-5, wherein the two or more subterranean feature probability maps comprise two or more geologic fault probability maps.

Example 7 is the method of examples 1-6, wherein training the two or more ML models comprises applying a bootstrapping model comprising: randomly selecting partial training data from the frequency-dependent training data; and measuring a probability distribution function that can quantify uncertainty in the ML model.

Example 8 is a system comprising: a processor; and a non-transitory computer-readable medium comprising instructions that are executable by the processor for causing the processor to perform operations comprising: applying spectral decomposition to pre-processed training data to generate frequency-dependent training data of two or more frequencies; training two or more machine-learning (ML) models using the frequency-dependent training data; subsequent to training the two or more ML models, applying the two or more ML models to seismic data to generate two or more subterranean feature probability maps; performing an analysis of aleatoric uncertainty on the two or more subterranean feature probability maps to create an uncertainty map for aleatoric uncertainty; and generating a filtered subterranean feature probability map based on the uncertainty map for aleatoric uncertainty.

Example 9 is the system of example 8, wherein performing the analysis of aleatoric uncertainty comprises: selecting one of the two or more subterranean feature probability maps; applying an algorithm to quantify aleatoric uncertainty in the selected subterranean feature probability map; and creating the uncertainty map for aleatoric uncertainty.

Example 10 is the system of example 9, wherein generating the filtered subterranean feature probability map comprises applying the uncertainty map to filter out high uncertainty areas from the selected subterranean feature probability map.

Example 11 is the system of examples 8-10, wherein the operations further comprise performing a structure-oriented filter on field seismic data to produce the pre-processed training data.

Example 12 is the system of example 11, wherein performing the structure-oriented filter comprises optimizing a size of a moving filter window to preserve discontinuities and reduce noise in the field seismic data.

Example 13 is the system of examples 8-12, wherein the two or more subterranean feature probability maps comprise two or more geologic fault probability maps.

Example 14 is the system of examples 8-13, wherein training the two or more ML models comprises applying a bootstrapping model comprising: randomly selecting partial training data from the frequency-dependent training data; and measuring a probability distribution function that can be used to quantify uncertainty in the ML model.

Example 15 is a non-transitory computer-readable medium comprising instructions that are executable by a processing device for causing the processing device to perform operations comprising: applying spectral decomposition to pre-processed training data to generate frequency-dependent training data of two or more frequencies; training two or more machine-learning (ML) models using the frequency-dependent training data; subsequent to training the two or more ML models, applying the two or more ML models to seismic data to generate two or more subterranean feature probability maps; performing an analysis of aleatoric uncertainty on the two or more subterranean feature probability maps to create an uncertainty map for aleatoric uncertainty; and generating a filtered subterranean feature probability map based on the uncertainty map for aleatoric uncertainty.

Example 16 is the non-transitory computer-readable medium of example 15, wherein performing the analysis of aleatoric uncertainty comprises: selecting one of the two or more subterranean feature probability maps; applying an algorithm to quantify aleatoric uncertainty in the selected subterranean feature probability map; and creating the uncertainty map for aleatoric uncertainty.

Example 17 is the non-transitory computer-readable medium of example 16, wherein generating the filtered subterranean feature probability map comprises applying the uncertainty map to filter out high uncertainty areas from the selected subterranean feature probability map.

Example 18 is the non-transitory computer-readable medium of examples 15-17, wherein the operations further comprise performing a structure-oriented filter on field seismic data to produce the pre-processed training data.

Example 19 is the non-transitory computer-readable medium of example 18, wherein performing the structure-oriented filter further comprises optimizing a size of a moving filter window to preserve discontinuities and reduce noise in the field seismic data.

Example 20 is the non-transitory computer-readable medium of examples 15-19, wherein the two or more subterranean feature probability maps comprise two or more geologic fault probability maps.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    applying spectral decomposition to pre-processed training data to generate frequency-dependent training data of two or more frequencies;
    training two or more machine-learning (ML) models using the frequency-dependent training data, wherein each ML model of the two or more ML models comprises a plurality of layers, wherein each ML model of the two or more ML models is trained using frequency-dependent training data of a different frequency than a frequency of frequency-dependent training data that is used to train a different ML model of the two or more ML models;
    subsequent to training the two or more ML models, applying the two or more ML models to seismic data to generate two or more subterranean feature probability maps;
    performing an analysis of aleatoric uncertainty on the two or more subterranean feature probability maps to create an uncertainty map for aleatoric uncertainty; and generating a filtered subterranean feature probability map based on the uncertainty map for aleatoric uncertainty.

2. The method of claim 1, wherein performing the analysis of aleatoric uncertainty comprises:
selecting one of the two or more subterranean feature probability maps;
applying an algorithm to quantify aleatoric uncertainty in the selected subterranean feature probability map; and
creating the uncertainty map for aleatoric uncertainty.

3. The method of claim 2, wherein generating the filtered subterranean feature probability map comprises applying the uncertainty map to filter out high uncertainty areas from the selected subterranean feature probability map.

4. The method of claim 1, further comprising performing a structure-oriented filter on field seismic data to produce the pre-processed training data.

5. The method of claim 4, wherein performing the structure-oriented filter comprises optimizing a size of a moving filter window to preserve geologic discontinuities and reduce noise in the field seismic data.

6. The method of claim 1, wherein the two or more subterranean feature probability maps comprise two or more geologic fault probability maps.

7. The method of claim 1, wherein training the two or more ML models comprises:
randomly selecting partial training data from the frequency-dependent training data; and
measuring, from the partial training data, a probability distribution function that can quantify uncertainty in the ML model.

8. A system comprising:
a processor; and
a non-transitory computer-readable medium comprising instructions that are executable by the processor for causing the processor to perform operations comprising:
applying spectral decomposition to pre-processed training data to generate frequency-dependent training data of two or more frequencies;
training two or more machine-learning (ML) models using the frequency-dependent training data in which each ML model of the two or more ML models is trained using frequency-dependent training data of a different frequency than a frequency of frequency-dependent training data that is used to train a different ML model of the two or more ML models, wherein each ML model of the two or more ML models comprises a plurality of layers;
subsequent to training the two or more ML models, applying the two or more ML models to seismic data to generate two or more subterranean feature probability maps;
performing an analysis of aleatoric uncertainty on the two or more subterranean feature probability maps to create an uncertainty map for aleatoric uncertainty; and
generating a filtered subterranean feature probability map based on the uncertainty map for aleatoric uncertainty.

9. The system of claim 8, wherein performing the analysis of aleatoric uncertainty comprises:
selecting one of the two or more subterranean feature probability maps;
applying an algorithm to quantify aleatoric uncertainty in the selected subterranean feature probability map; and
creating the uncertainty map for aleatoric uncertainty.

10. The system of claim 9, wherein generating the filtered subterranean feature probability map comprises applying the uncertainty map to filter out high uncertainty areas from the selected subterranean feature probability map.

11. The system of claim 8, wherein the operations further comprise performing a structure-oriented filter on field seismic data to produce the pre-processed training data.

12. The system of claim 11, wherein performing the structure-oriented filter comprises optimizing a size of a moving filter window to preserve geologic discontinuities and reduce noise in the field seismic data.

13. The system of claim 8, wherein the two or more subterranean feature probability maps comprise two or more geologic fault probability maps.

14. The system of claim 8, wherein training the two or more ML models comprises:
randomly selecting partial training data from the frequency-dependent training data; and
measuring, using the partial training data, a probability distribution function that can be used to quantify uncertainty in the ML model.

15. A non-transitory computer-readable medium comprising instructions that are executable by a processing device for causing the processing device to perform operations comprising:
applying spectral decomposition to pre-processed training data to generate frequency-dependent training data of two or more frequencies;
training two or more machine-learning (ML) models using the frequency-dependent training data in which each ML model of the two or more ML models is trained using frequency-dependent training data of a different frequency than a frequency of frequency-dependent training data that is used to train a different ML model of the two or more ML models, wherein each ML model of the two or more ML models comprises a plurality of layers;
subsequent to training the two or more ML models, applying the two or more ML models to seismic data to generate two or more subterranean feature probability maps;
performing an analysis of aleatoric uncertainty on the two or more subterranean feature probability maps to create an uncertainty map for aleatoric uncertainty; and
generating a filtered subterranean feature probability map based on the uncertainty map for aleatoric uncertainty.

16. The non-transitory computer-readable medium of claim 15, wherein performing the analysis of aleatoric uncertainty comprises:
selecting one of the two or more subterranean feature probability maps;
applying an algorithm to quantify aleatoric uncertainty in the selected subterranean feature probability map; and
creating the uncertainty map for aleatoric uncertainty.

17. The non-transitory computer-readable medium of claim 16, wherein generating the filtered subterranean feature probability map comprises applying the uncertainty map to filter out high uncertainty areas from the selected subterranean feature probability map.

18. The non-transitory computer-readable medium of claim 15, wherein the operations further comprise performing a structure-oriented filter on field seismic data to produce the pre-processed training data.

19. The non-transitory computer-readable medium of claim 18, wherein performing the structure-oriented filter further comprises optimizing a size of a moving filter window to preserve geologic discontinuities and reduce noise in the field seismic data.

20. The non-transitory computer-readable medium of claim 15, wherein the two or more subterranean feature probability maps comprise two or more geologic fault probability maps.

* * * * *